United States Patent
Wei et al.

(10) Patent No.: US 8,880,199 B2
(45) Date of Patent: Nov. 4, 2014

(54) SMART LIGHTING CONTROL SYSTEM

(75) Inventors: Chao-Huang Wei, Tainan (TW); Chia-Wei Yang, Tainan (TW); Wan-Tzu Chen, Tainan (TW)

(73) Assignee: Southern Taiwan University, Tainan (TW)

( * ) Notice: Subject to any disclaimer, the term of this patent is extended or adjusted under 35 U.S.C. 154(b) by 307 days.

(21) Appl. No.: 13/234,220

(22) Filed: Sep. 16, 2011

(65) Prior Publication Data

US 2013/0073058 A1    Mar. 21, 2013

(51) Int. Cl.
| | |
|---|---|
| G05B 19/18 | (2006.01) |
| G05B 15/02 | (2006.01) |
| G05B 13/02 | (2006.01) |
| G05B 11/01 | (2006.01) |
| H05B 37/02 | (2006.01) |
| H05B 33/08 | (2006.01) |

(52) U.S. Cl.
CPC ........ H05B 37/0254 (2013.01); H05B 33/0842 (2013.01); Y02B 20/48 (2013.01)
USPC ............. 700/11; 700/295; 315/159; 315/291; 307/66; 362/276

(58) Field of Classification Search
USPC ........ 700/11, 295; 307/66; 315/159; 362/276
See application file for complete search history.

(56) References Cited

U.S. PATENT DOCUMENTS

| 8,170,722 B1 * | 5/2012 | Elberbaum .................... 700/295 |
| 8,491,159 B2 * | 7/2013 | Recker et al. .................. 362/276 |
| 2010/0141153 A1 * | 6/2010 | Recker et al. .................. 315/149 |
| 2010/0271802 A1 * | 10/2010 | Recker et al. .................... 362/20 |
| 2010/0327766 A1 * | 12/2010 | Recker et al. .................. 315/291 |
| 2011/0121654 A1 * | 5/2011 | Recker et al. .................... 307/66 |
| 2011/0133655 A1 * | 6/2011 | Recker et al. .................. 315/159 |

* cited by examiner

Primary Examiner — Kavita Padmanabhan
Assistant Examiner — Douglas Lee
(74) Attorney, Agent, or Firm — Alan Kamrath; Kamrath IP Lawfirm, P.A.

(57) ABSTRACT

A smart lighting control system has a central control unit and at least one lighting module. The lighting module has its own controller, an ambient light sensor, a current sensor, and an emergency button and is connected to the central control unit and other modules via a serial port. Each lighting module can follow commands from the central control unit to display a specific lighting effect or adjust its brightness according to the ambient light automatically or to switch to another color or lighting effect to generate a warning signal.

10 Claims, 9 Drawing Sheets

SMART LIGHTING CONTROL SYSTEM

BACKGROUND OF THE INVENTION

1. Field of the Invention

The present invention relates to a smart lighting control system and, more particularly, to the lighting control system capable of controlling the ON and OFF of a light source and adjusting the brightness automatically and achieving the effects of saving power consumption, changing colors of a light emitting device or blinking the light emitting device according to environments and road conditions to alert others to pay attention to safety.

2. Description of the Related Art

A roadlamp is one of the important public facilities for maintaining the traffic safety for man and motor vehicles at nighttime, so that a normal operation of the roadlamps is an important issue. Since roadlamps are installed along each road in a city or a remote area, the quantity of roadlamps is large, and their operation and management are relatively complicated. After the roadlamps are built, the management, repair and maintenance require much manpower and efforts. To lower the operation cost of the roadlamps, it is necessary to turn on and off the roadlamps effectively to achieve the effects, and to choose LED lamps that can save power and extend the service life. However, the management staff should understand the actual operation condition of the roadlamps, such that maintenance people can be informed to repair a failed road lamp quickly. To achieve the goal of power saving and carbon reduction, different solutions for controlling and managing smart roadlamps are provided. For example, a light detector is installed to the road lamp, and the roadlamps are turned on or off according to the brightness of the external light. However, the roadlamps may be turned on or off incorrectly due to natural damage, intentional damage or a failure of a light sensor. As a result, no road lamp illumination is provided when needed, or the road lamp keeps on operating and wastes electric power. The LED road lamp not only has the advantages of saving power, providing a long service life, and being turned on or off quickly, but the LED road lamp also provides the function of adjusting the color and brightness of the road lamp. A conventional way of controlling roadlamps is to install a timer switch to roadlamps scattered in a country side to control one to three roadlamps. A timer switch with a solenoid control is installed to a row of roadlamps in suburban or industrial areas. The timer switch control is installed at the service center of an electricity company. The timer switch with a first solenoid switch is linked with each solenoid switch installed to the same line of the roadlamps, and a specified transformer is installed for turning on and off the roadlamps. Obviously, the present road lamp only provides the function of being turned on or off, but the whole row of roadlamps does not come with an individual control. Thus, the present invention relates to a smart lighting control system to overcome the drawbacks of the conventional roadlamps.

SUMMARY OF THE INVENTION

Therefore, it is a primary objective of the present invention to provide a smart lighting control system capable of controlling the ON and OFF of a light source automatically and adjusting the brightness to save power consumption, and to achieve the effects of changing the lighting color or blinking the light emitting device to effect alerting others to pay attention to safety.

To achieve the aforementioned objectives, the present invention provides a smart lighting control system having a central control unit coupled to a control module of at least one light emitting device through a transmission interface. The control module comprises a digital signal processing unit coupled to a light sensor, at least one serial transmission interface, a current detector and an emergency button. The digital signal processing unit is coupled to a control circuit of at least one light emitting device, and the control circuit is coupled to a collection module of the light emitting device. With the serial connection by the central control unit, control signals are transmitted to each light emitting device one by one to control the emitted light color of each light emitting device individually. In addition, the brightness of each light emitting device can be adjusted according to the ambient light intensity to save power consumption, and the light emitting device can blink to alert others to pay attention to safety.

DETAILED DESCRIPTION OF THE PREFERRED EMBODIMENTS

The technical characteristics and effects of the present invention will become apparent with the detailed description of preferred embodiments accompanied with the illustration of related drawings of the present invention as follows.

Figure 1:
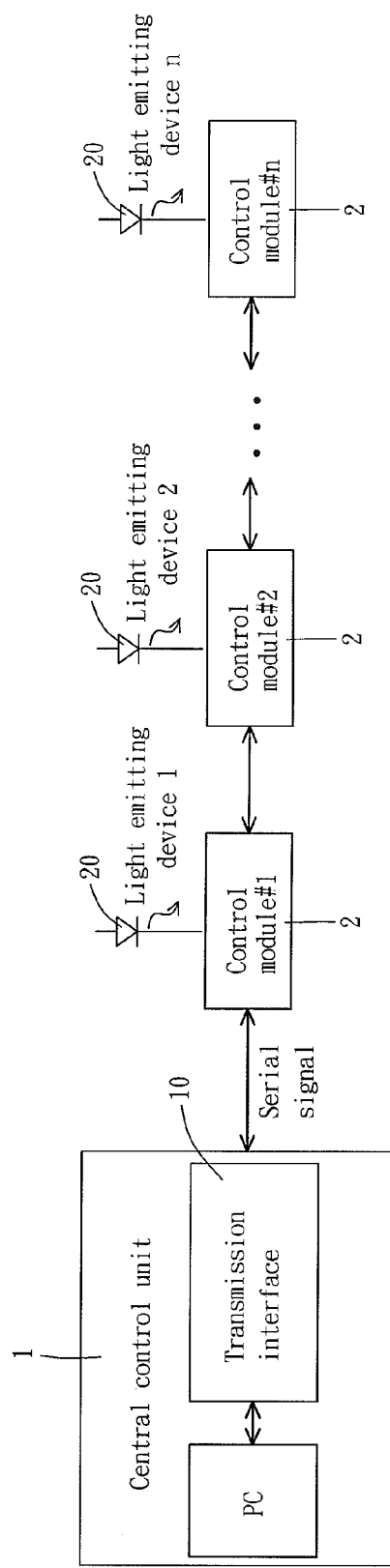
FIG. 1 is a block diagram of a first preferred embodiment of the present invention.
Figure 2:
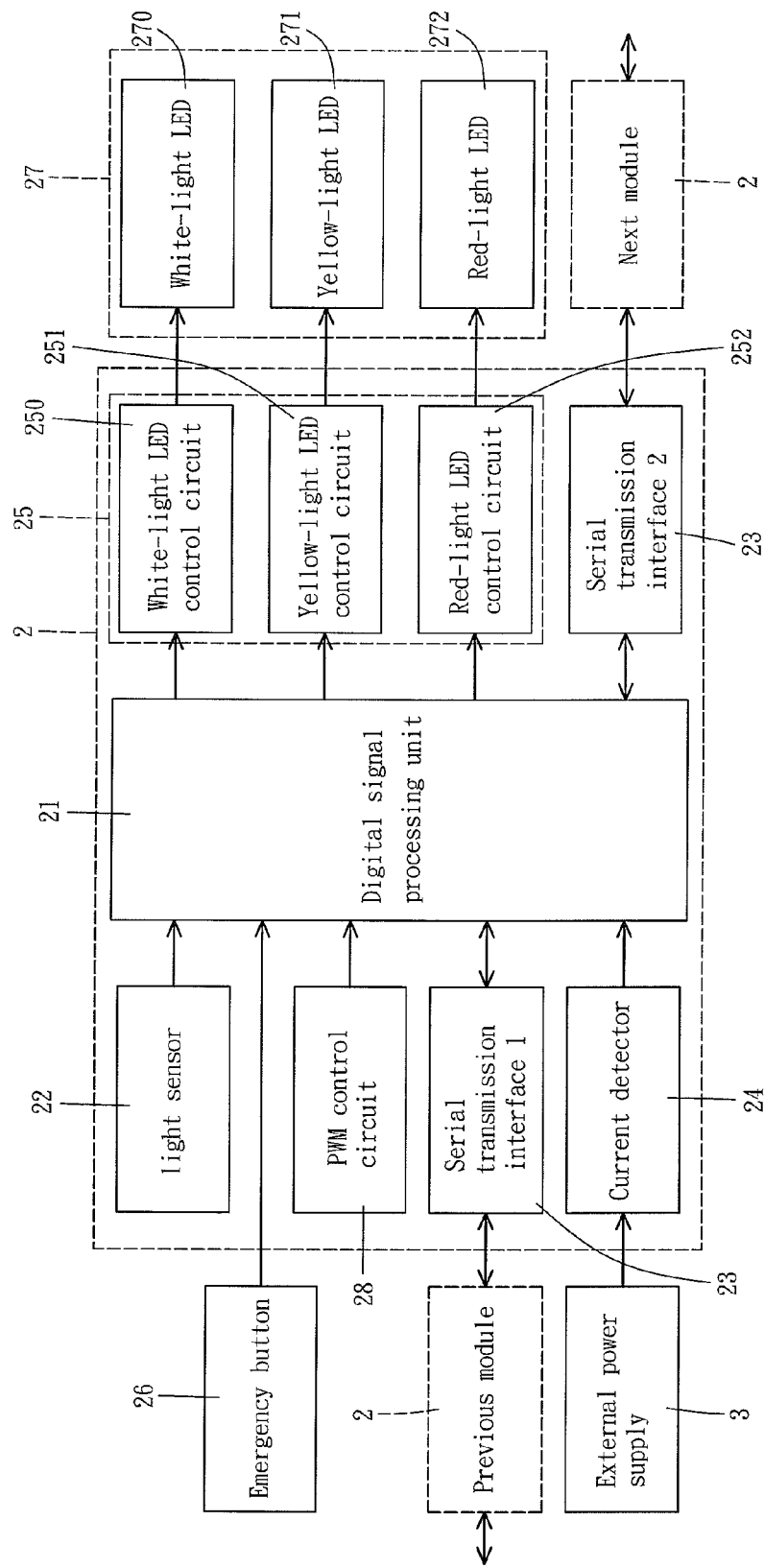
FIG. 2 is a block diagram of a control module of the first preferred embodiment of the present invention.

With reference to FIGS. 1 and 2, a central control unit 1 of the first preferred embodiment of the present invention can be a numerical processor such as a computer, a PDA or any other mobile device with a transmission interface. The central control unit 1 is coupled to a control module 2 of at least one light emitting device 20 through a transmission interface 10. The transmission interface 10 is preferably a RS485 transmission interface, and the light emitting device 20 can be a light emitting diode (LED). The control module 2 includes a digital signal processing unit 21 coupled to a light sensor 22, two serial transmission interfaces 23, a current detector 24, a control circuit 25 and an emergency button 26 of at least one light emitting device 20. The control circuit 25 of the light emitting device 20 is coupled to a collection module 27 of the light emitting device 20. The serial transmission interface 23 is a RS485 serial interface, and the control module 2 of the light emitting device 20 comprises a pulse width modulation control circuit 28 for adjusting the brightness of the light emitting device 20. The control circuit 25 of the light emitting device 20 comprises a white-light LED control circuit 250, a yellow-light LED control circuit 251 and a red-light LED control circuit 252, and the collection module 27 of the light emitting device 20 comprises a white-light LED 270, a yellow-light LED 271 and a red-light LED 272. The control module 25 of the light emitting device 20 is coupled to an external power supply 3.

With reference to FIG. 1, the central control unit 1 can be installed in a road lamp management department or traffic control center for controlling the operation of the entire road lamp system. The central control unit 1 can be a personal computer with an operating interface, so that users can use the operating interface to a specific desired illumination effect of each light emitting device 20 through the computer. A transmission interface 10 is provided for downloading the control signal to each control module 2. The use of the RS485 transmission interface allows a 1-to-many communication or even a many-to-many communication, and the maximum transmission distance at the transmission rate of 100 KPS can be up to 1.2 Km. This transmission interface has a very good interference resisting characteristic, so that the RS485 transmission interface can be used for building a long-distance network control.

In FIGS. 1 and 2, the control modules 2 of the light emitting devices 20 are coupled to one another through the serial transmission interface 23, and the control module 2 of the front light emitting device 20 is coupled to the transmission interface 10 of the central control unit 1. The digital signal processing unit 21 reads the ambient light intensity by the light sensor 22 to turn on/off or to adjust the brightness of the white-light LED 270. The yellow-light LED and red-light LED control circuits are provided for driving the yellow-light LED 271 and the red-light LED 272 roadlamps to be turned on, off, or blink. In addition, a user can press the emergency button 4 to turn on the red-light LED 272 to blink. Each control module 2 comes with a bi-directional data transmission feature. The downloaded data are control signals, and the uploaded data are response signals. When the data received by the serial transmission interface is used for controlling the light emitting device 20, the digital signal processing unit of the control module 2 transmits the control data to the control circuit 25 of the light emitting device 20 to control the light illumination effect of each LED, or the data is transmitted to the next control module 2 through another serial transmission interface 23. After the control module 2 receives information returned by the next control module 2 from another serial transmission interface 23, the digital signal processing unit 21 will transmit this information to the previous control module 2 from the serial transmission interface 23, and will finally transmit the information to the central control unit 1 for further processing.

Figure 3:
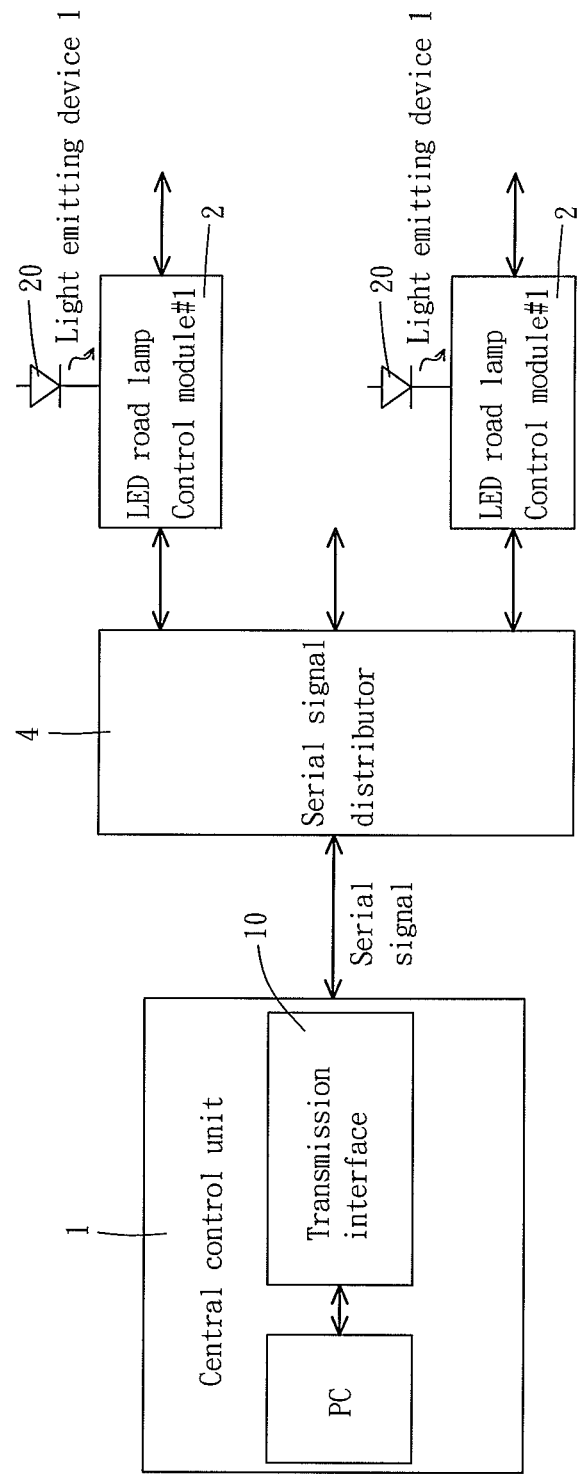
FIG. 3 is a block diagram of a second preferred embodiment of the present invention.
Figure 4:
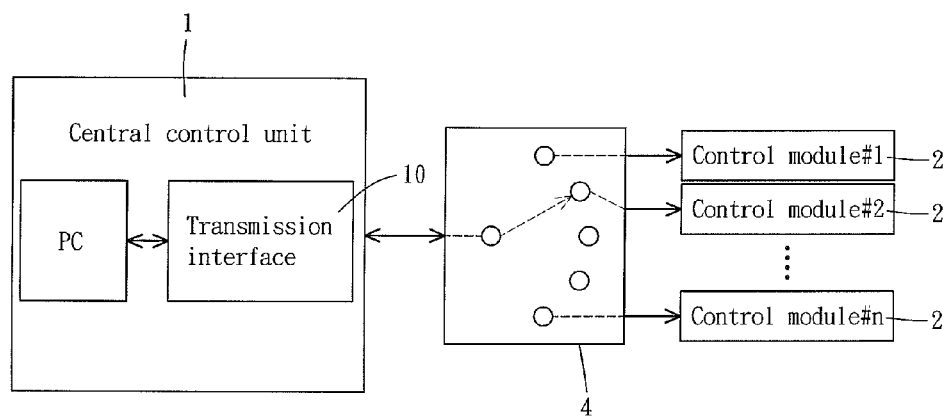
FIG. 4 is a schematic view of downloading a control data packet in accordance with a second preferred embodiment of the present invention.
Figure 5:
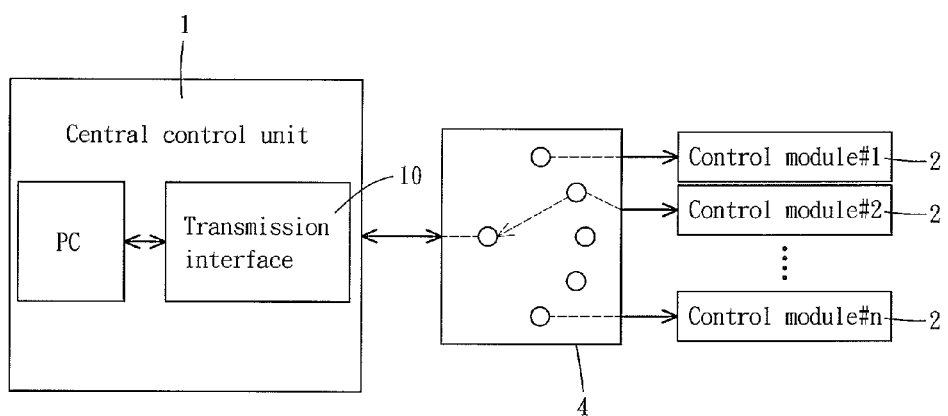
FIG. 5 is a schematic view of uploading an information data packet in accordance with the second preferred embodiment of the present invention.

With reference to FIG. 3 for the second preferred embodiment of the present invention, the transmission interface 10 of the central control unit 1 is coupled to a serial signal distributor 4. Thus, after the control modules 2 of the light emitting devices 20 are coupled to one another through the serial transmission interface 23, the control module 2 of the front light emitting device 20 is coupled to the serial signal distributor 4. The serial signal distributor 4 outputs the data packet received from the central control unit 1 to the control module 2 of a selected light emitting device 20. After the control module 2 of each light emitting device 20 receives the uploaded data packet, a number is added, and then uploaded to the central control unit 1. Thus, the central control unit 1 receives returned information of a plurality of control modules 2 through a single serial transmission interface 23 (as shown in FIGS. 4 and 5).

Figure 6:
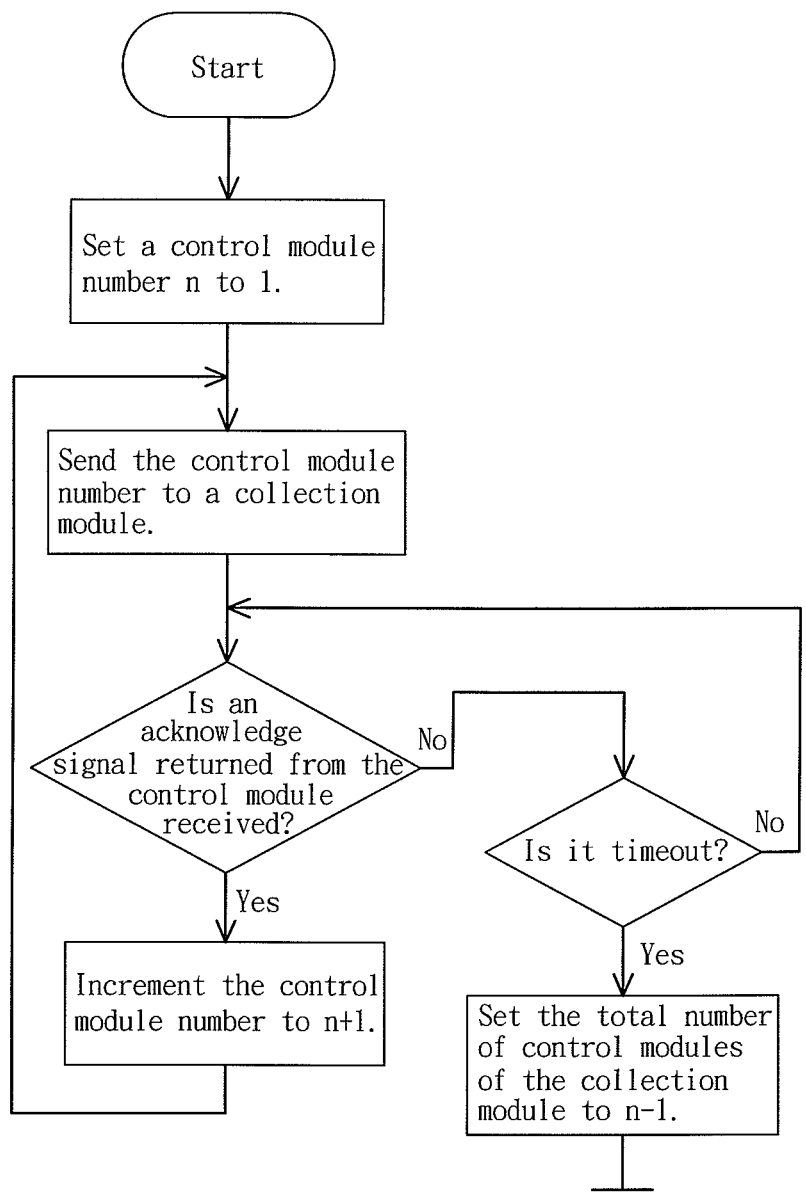
FIG. 6 is a flow chart (1) of setting a central control unit number in accordance with the first preferred embodiment of the present invention.

In FIG. 6, each control module 2 has its own number, and the central control unit 1 controls each control module 2 by this number. The central control unit 1 has the following first numbering procedure:

(a) setting a number of the control module of the light emitting device to N, and setting N to 1;
(b) transmitting the number of the control module of the light emitting device to the collection module of the light emitting device;
(c) confirming whether or not the number is received;
(d) incrementing the number of the control module of the light emitting device to N+1, and returning to Step (b) if the number is received;
(e) detecting whether or not it is a timeout, if the number is not received;
(f) returning to Step (c) if it is not a timeout; and
(g) setting the total number of the collection modules of the light emitting device to N−1 if it is a timeout.

Figure 7:
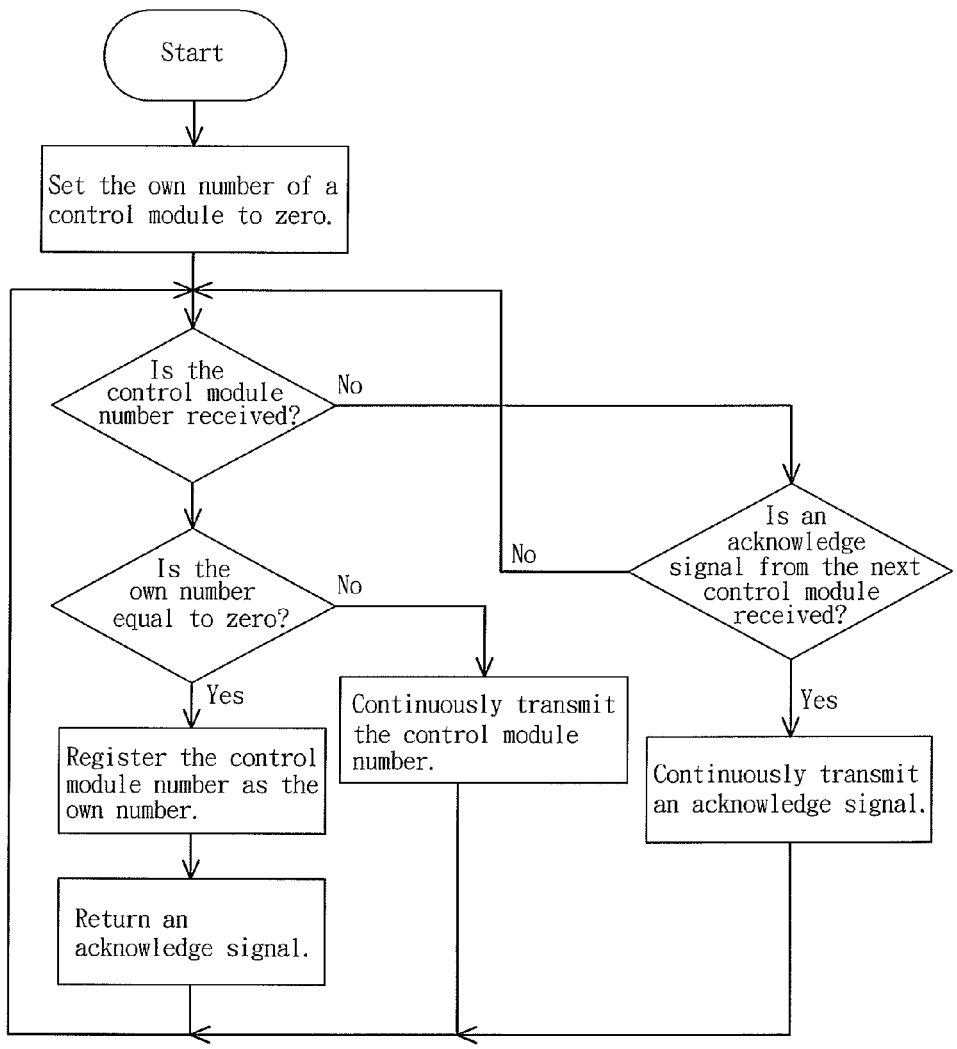
FIG. 7 is a flow chart (1) of setting a control unit number in accordance with the first preferred embodiment of the present invention.

In FIG. 7, the control module has the following first numbering procedure:

(a) setting an own number of the control module of the light emitting device to zero;
(b) detecting whether or not the number is received;
(c) detecting whether or not the own number is zero, if the number is received;
(d) registering the number as the own number, if the own number is zero;
(e) returning an acknowledge signal, and returning to Step (b);
(f) detecting whether or not the acknowledge signal of the control module of the next light emitting device is received, if the number is not received;
(g) continuously transmitting the acknowledge signal, and returning to Step (b) if the acknowledge signal of the control module of the next light emitting device is received;
(h) returning to Step (b) if the acknowledge signal of the next control module of the light emitting device is not received; and
(i) continuously transmitting a number, and returning to Step (b) if the own number is not equal to zero.

Figure 8:
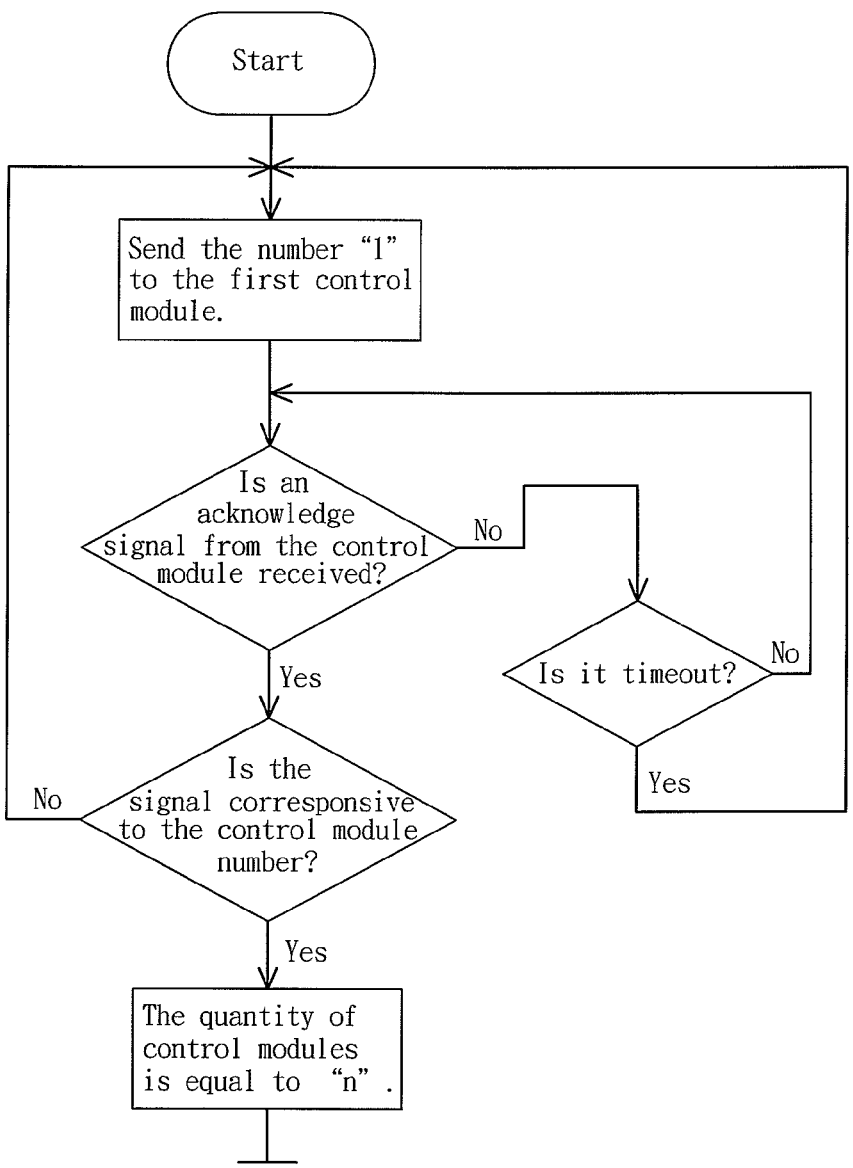
FIG. 8 is a flow chart (2) of setting a central control unit number in accordance with the first preferred embodiment of the present invention.

In FIG. 8, the central control unit has the following second numbering procedure:

(a) setting a number of a control module of a first light emitting device to 1;
(b) detecting whether or not a response signal of the control module of the light emitting device is received;
(c) detecting whether or not the response signal corresponds to the number of the control module of the light emitting device, if the response signal is received;
(d) setting the quantity of the control modules of the light emitting device to n, if the number of the control module of the light emitting device is confirmed;
(e) determining whether or not it is a timeout, if the response signal is not received;
(f) returning to Step (a) if it is a timeout;
(g) returning to Step (b) if it is not a timeout; and
(h) returning to Step (a) if the response signal not correspond to the number of the control module of the light emitting device.

Figure 9:
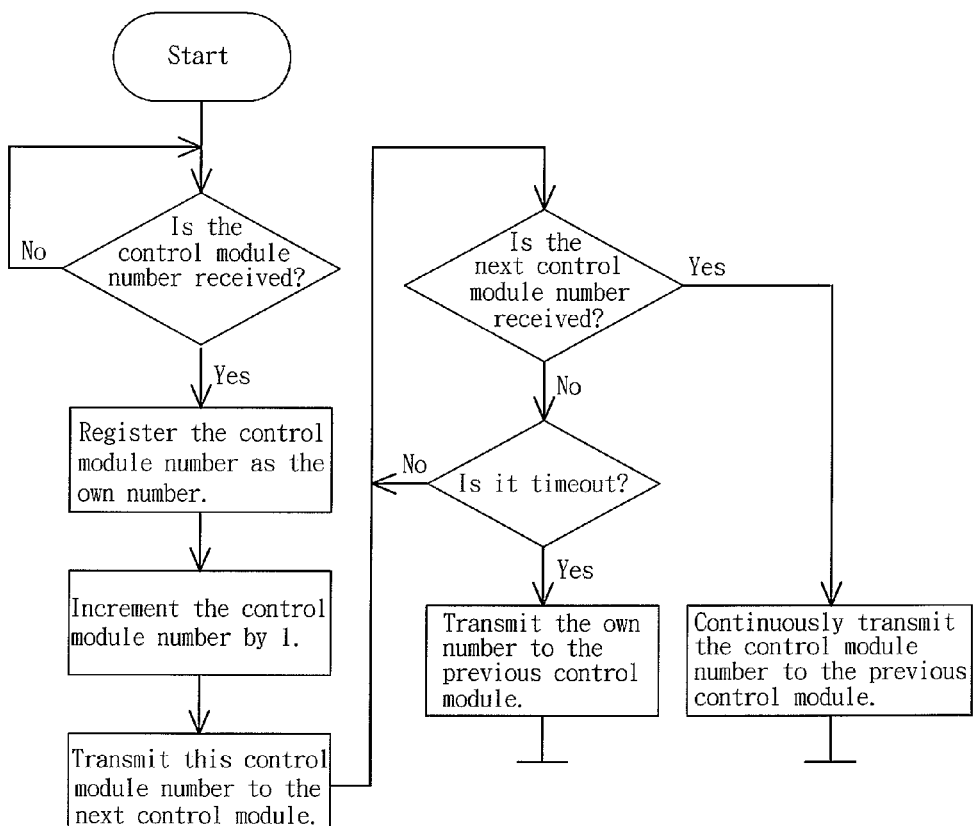
FIG. 9 is a flow chart (2) of setting a control unit number in accordance with the first preferred embodiment of the present invention.

In FIG. 9, the control module has the following second numbering procedure:
(a) detecting whether or not the number of the control module of the light emitting device is received;
(b) registering the number of the control module of the light emitting device as its own number if the number of the control module of the light emitting device is received, and incrementing the number of the control module of the light emitting device to number+1, and transmitting said number to a control module of the next light emitting device;
(c) detecting whether or not the number of the control module of the next light emitting device is received;
(d) continuously transmitting a module number to the control module of the previous light emitting device, if the number of the control module of the next light emitting device is received;
(e) returning to Step (a) if the number of the control module of the light emitting device is not received;
(f) detecting whether or not it is a timeout, if the number of the control module of the light emitting device is not received;
(g) returning to Step (c), if it is not a timeout; and
(h) transmitting the own number to the control module of the previous light emitting device if it is a timeout.

Figure 10:
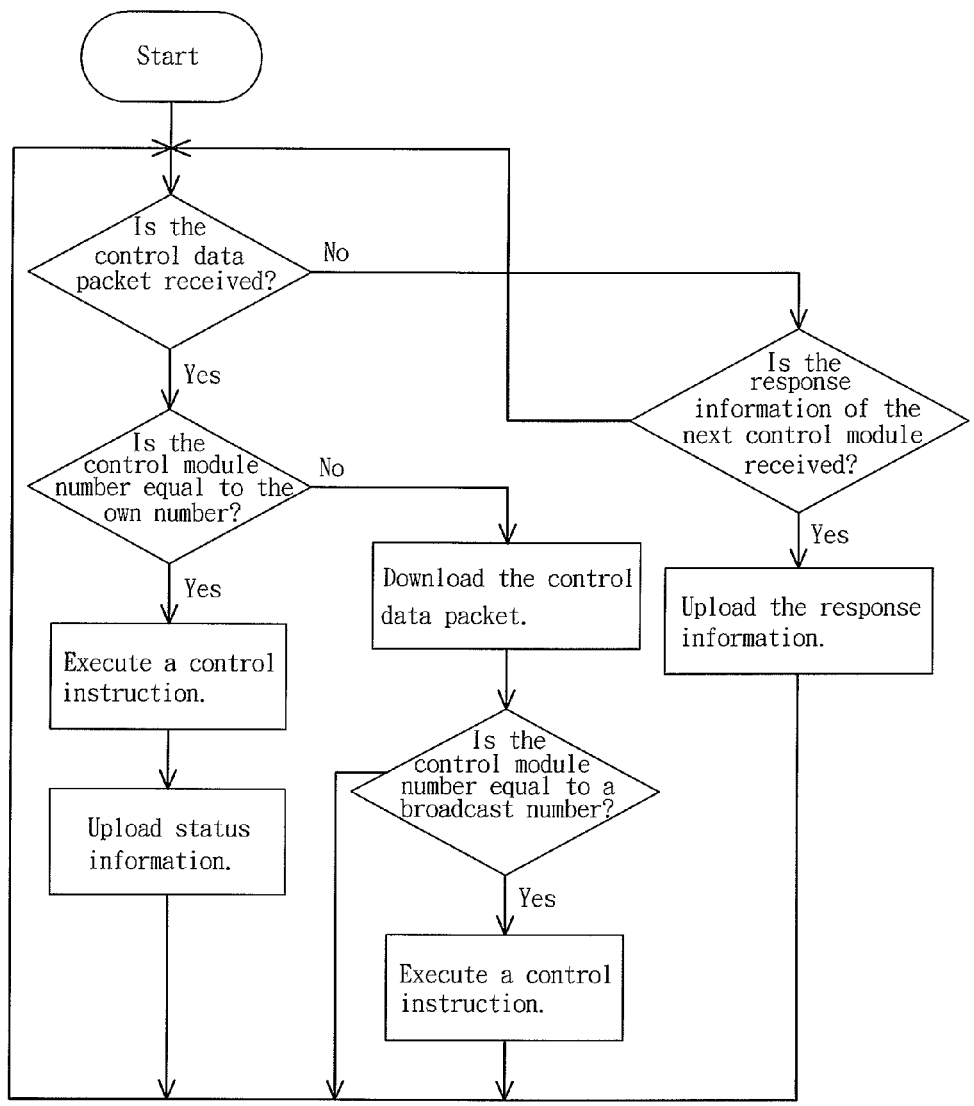
FIG. 10 is a flow chart of transmitting control data in accordance with the first preferred embodiment of the present invention.

In FIG. 10, the control data transmission procedure of the control module of the light emitting device comprises the following steps:
(a) transmitting a data packet to a first control module of the light emitting device coupled to the central control unit through a serial interface by a central control unit, with the data packet including a control module number, a control instruction and a control datum of the light emitting device;
(b) checking whether or not the control module of the first light emitting device receives the data packet;
(c) checking whether or not the control module number in the data packet matches with the own number, if the data packet as described in Step (a) is received;
(d) executing a control instruction in the data packet by a digital signal processing unit installed in the control module of the light emitting device and controlling a display effect of the LED light emitting device according to the control data, and repeating Step (b), if the control module number of the light emitting device matches the own number;
(e) continuously transmitting a data packet to the next module by the control module of the light emitting device, and repeating Step (b), if the control module number of Step (c) is not matched with the own number;
(f) continuously transmitting a data packet to the previous module, and repeating Step (b), if the control module of the light emitting device receives a data packet returned from the next module, with the data packet includes a control module number and LED status information of the light emitting device; and
(g) repeating Steps (b) to (f) for the remaining control modules of each light emitting device.

In summation, the present invention has the following advantages and effects:
1. Each control module 2 has a common control circuit 25, and a serial transmission interface 23 is provided for serially connecting each control module 2, so that when the control module 2 is damaged, the control module 2 can be replaced directly to facilitate repair and maintenance.
2. Each control module 2 has a light sensor 22 used for adjusting the light intensity automatically to save power consumption.
3. The display of each light emitting device 20 is controlled by the central control unit 1 at a remote sit; such as the traffic control center, so that the display effect of the light emitting device 20 can be controlled by modifying a main program without physically involving the installed light emitting device 20. The central control unit 1 can monitor all or one light emitting device 20, and each light emitting device 20 can be turned ON/OFF, controlled or adjusted.
4. The number of the serially connected light emitting devices 20 in each system is unlimited, and the light emitting device 20 can be added or removed freely. The main control program can detect the total number automatically. If the quantity of the light emitting devices 20 does not match with the total number, then, the failure location can be observed immediately.
5. The distance between light emitting devices 20 can be up to 1 Km.
6. The illumination color of each light emitting device 20 can be changed according to the environment and road conditions to alert drivers about the road condition in front to improve traveling safety.
7. The emergency button 26 connected to each light emitting device 20 drives the red-light LED 272 to blink to alert other drivers, and to allow an ambulance to reach the accident site immediately.

While the invention has been described by means of specific embodiments, numerous modifications and variations of the smart lighting control system could be made thereto by those skilled in the art without departing from the scope and spirit of the invention set forth in the claims.

What is claimed is:
1. A smart lighting control system comprising,
a central control unit;
a transmission interface;
first and second control modules each downloading a control signal and uploading a response signal;
a serial transmission interface;
first and second digital signal processing units;
first and second light sensors;
first and second current detectors;
first and second control circuits;
first and second collection modules; and
first and second light emitting devices;
wherein the central control unit is coupled through the transmission interface to the first control module, with the first control module coupled to the second control module through the serial transmission interface to provide bi-directional flow of data, with the first and second control modules comprising the first and second digital signal processing units, the first and second light sensors, the first and second current detectors, the first and second control circuits, the first and second collection modules, and the first and second light emitting devices respectively,
wherein the first digital signal processing unit is coupled to the first light sensor, the first current detector, and the first control circuit, with the first control circuit coupled to the first collection module, with the first collection module coupled to the first light emitting device, and
wherein the second digital signal processing unit is coupled to the second light sensor, the second current detector, and the second control circuit, with the second control circuit coupled to the second collection module, and with the second collection module coupled to the second light emitting device.

2. The smart lighting control system of claim 1, wherein the first control circuit coupled to the first light emitting device comprises a white-light LED, a yellow-light LED and a red-light LED, with the first control circuit controlling ON/OFF/ brightness of the first collection module of the first light emitting device, and wherein the first collection module comprises a white-light LED control circuit, a yellow-light LED control circuit and a red-light LED control circuit, and an emergency button.

3. The smart lighting control system of claim 1, wherein the central control unit is a numerical processor, a computer, a personal digital assistant or a mobile device with the transmission interface.

4. The smart lighting control system of claim 1, wherein the serial transmission interface is a RS485 serial interface.

5. The smart lighting control system of claim 1, wherein the first control module coupled to the first light emitting device includes a pulse width modulation control circuit.

6. A smart light emitting device control method for checking a first control module coupled to a first light emitting device, and a second control module coupled to a second light emitting device; wherein the first control module is coupled through a serial transmission interface to the second control module to provide bi-directional flow of data, with each control module downloading a control signal and uploading a response signal, comprising the steps of:
  (a) setting a number of the first control module coupled to the first light emitting device to N, and setting N to 1;
  (b) transmitting the number of the first control module coupled to the first light emitting device resulting in a first transmitted number to a collection module of the first light emitting device, wherein the first transmitted number is the control signal;
  (c) transmitting a confirmation signal providing a confirmation of whether or not the first transmitted number is received, wherein the confirmation signal is the response signal;
  (d) incrementing a number of the second control module coupled to the second light emitting device to N+1 resulting in a incremented number, and returning to Step (b) if the incremented number is received;
  (e) detecting whether or not a timeout has occurred, if the incremented number is not received;
  (f) returning to Step (c) if the timeout has not occurred; and
  (g) reducing the number of the second control modules coupled to the second light emitting device to N−1 if the timeout has occurred, the reduction of the number of the second control module coupled to the second light emitting device comprising a reduced number.

7. The smart lighting control system of claim 6, wherein setting the numbers of the first and second control modules coupled to the first and second light emitting devices respectively, comprises the steps of:
  (a) setting the number of the first control module coupled to the first light emitting device to zero;
  (b) detecting whether or not the number of the first control module coupled to the first light emitting device is received;
  (c) detecting whether or not the number of the first control module coupled to the first light emitting device is zero, if the number of the first control module coupled to the first light emitting device is received;
  (d) transmitting an acknowledge signal of the first control module coupled to the first light emitting device, and returning to Step (b);
  (e) detecting whether or not an acknowledge signal of another control module coupled to the other light emitting device is received, if the number of the first control module coupled to the first light emitting device is not received;
  (f) continuously transmitting the acknowledge signal of the first control module coupled to the first light emitting device, and returning to Step (b) if the acknowledge signal of other control module coupled to the other light emitting device is received;
  (g) returning to Step (b) if the acknowledge signal of the control module coupled to the other light emitting device is not received; and
  (h) continuously transmitting the incremented number, and returning to Step (b) if the number of the first control module coupled to the first light emitting device is not equal to zero.

8. A smart light emitting device control method, applied to first and second control modules coupled to first and second light emitting devices respectively, with a central control unit installed therein for numbering, comprising the steps of:
  (a) setting a number of the first control module coupled to the first light emitting device to 1;
  (b) setting a number of the second control module coupled to the second light emitting device to an incremented number;
  (c) transmitting a response signal of the first control module coupled to the first light emitting device, and detecting whether or not the response signal of the first control module coupled to the first light emitting device is received;
  (d) detecting whether or not the response signal of the first control module coupled to the first light emitting device corresponds to the number of the first control module coupled to the first light emitting device, if the response signal of the first control module coupled to the first light emitting device is received;
  (e) setting a quantity of first and second control modules coupled to the first and second light emitting devices, respectively to n, if the number of the first control module coupled to the first light emitting device is confirmed;
  (f) determining whether or not a timeout has occurred, if the response signal of the first control module coupled to the first light emitting device is not received;
  (g) returning to Step (a) if the timeout has occurred;
  (h) returning to Step (c) if the timeout has not occurred; and
  (i) returning to Step (a) if the response signal of the first control module coupled to the first light emitting device does not correspond to the incremented number of the second control module coupled to the second light emitting device.

9. The smart lighting control system of claim 8, wherein setting the numbers of the first and second control modules coupled to the first and second light emitting devices respectively, comprises the steps of:
  (a) detecting whether or not the number of the first control module coupled to the first light emitting device is received;
  (b) registering the number of the first control module coupled to the first light emitting device if the number of the first control module coupled to the first light emitting device is received, and incrementing the number of the second control module coupled to the second light emitting device to N+1 resulting in the incremented number, and transmitting the incremented number of the second control module coupled to the second light emitting device to the second control module coupled to the second light emitting device;
  (c) detecting whether or not the incremented number of the second control module coupled to the second light emitting device is received;

(d) continuously transmitting the module number of the first control module coupled to the first light emitting device to the first control module coupled to the first light emitting device, if the incremented number of the second control module coupled to the light emitting device is received;

(e) returning to Step (a) if the incremented number of the second control module coupled to the second light emitting device is not received;

(f) detecting whether or not the timeout has occurred, if the incremented number of the second control module coupled to the second light emitting device is not received;

(g) returning to Step (c), if the timeout has not occurred; and (h) transmitting the incremented number of the second control module coupled to the second light emitting device to the first control module coupled to the second light emitting device if the timeout has occurred.

10. The smart lighting control system of claim 7, wherein transmitting control data of the first and second control modules coupled to the first and second light emitting devices respectively comprises the steps of:

(a) transmitting a data packet to the first control module coupled to the first light emitting device coupled to a central control unit through a transmission interface with bi-directional flow of data, wherein the data packet includes the incremented number of the second control module coupled to the second light emitting device, a control instruction and a control datum of the light emitting device;

(b) checking whether or not the first control module coupled to the first light emitting device receives the data packet;

(c) checking whether or not the incremented number of the second control module coupled to the second light emitting device in the data packet matches with the number of the first control module coupled to the first light emitting device, if the data packet as described in Step (a) is received;

(d) executing a control instruction in the data packet by a digital signal processing unit installed in the first control module coupled to the first light emitting device and controlling a display effect of the first light emitting device according to the control datum, and repeating Step (b), if the number of the first control module coupled to the first light emitting device matches the number of the first control module coupled to the first light emitting device;

(e) continuously transmitting the data packet to the second control module coupled to the second light emitting device, and repeating Step (b), if the number of the second control module coupled to the second light emitting device of Step (c) is not matched with the incremented number of the second control module coupled to the second light emitting device;

(f) continuously transmitting the data packet to the first control module coupled to the first light emitting device, and repeating Step (b), if the first control module coupled to the first light emitting device receives the data packet returned from the second control module coupled to the second light emitting device, wherein the data packet includes the incremented number of the second control module coupled to the second light emitting device and LED status information of the light emitting device; and (g) repeating Steps (b) to (f) for another control module coupled to another light emitting device.

\* \* \* \* \*